US011507696B2

(12) United States Patent
Diekmann et al.

(10) Patent No.: US 11,507,696 B2
(45) Date of Patent: *Nov. 22, 2022

(54) RESTRICTING PLUG-IN APPLICATION RECIPES

(71) Applicant: Oracle International Corporation, Redwood Shores, CA (US)

(72) Inventors: Tim Diekmann, San Jose, CA (US); Tuck Chang, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 17/125,096

(22) Filed: Dec. 17, 2020

(65) Prior Publication Data

US 2021/0103671 A1    Apr. 8, 2021

Related U.S. Application Data

(63) Continuation of application No. 15/994,332, filed on May 31, 2018, now Pat. No. 10,902,152.

(60) Provisional application No. 62/527,958, filed on Jun. 30, 2017.

(51) Int. Cl.
*G06F 21/52*    (2013.01)
*G06F 21/62*    (2013.01)
*G06F 21/60*    (2013.01)
*G06F 9/445*    (2018.01)
*G06F 21/31*    (2013.01)

(52) U.S. Cl.
CPC ........ *G06F 21/629* (2013.01); *G06F 9/44526* (2013.01); *G06F 21/31* (2013.01); *G06F 21/604* (2013.01); *G06F 21/62* (2013.01)

(58) Field of Classification Search
CPC ...... G06F 21/629; G06F 21/31; G06F 21/604; G06F 21/62; G06F 9/44526
See application file for complete search history.

(56) References Cited

U.S. PATENT DOCUMENTS

| 8,606,656 B1 | 12/2013 | Franklin et al. |
| 2003/0145094 A1 | 7/2003 | Staamann et al. |
| 2012/0300960 A1 | 11/2012 | Mackay et al. |
| 2012/0324091 A9 | 12/2012 | Raleigh et al. |
| 2013/0305354 A1 | 11/2013 | King et al. |
| 2015/0082372 A1 | 3/2015 | Kottahachchi et al. |

(Continued)

*Primary Examiner* — Ashokkumar B Patel
*Assistant Examiner* — William B Jones
(74) *Attorney, Agent, or Firm* — Invoke

(57) ABSTRACT

Techniques for restricting plug-in application recipes ("PIARs") are disclosed. A PIAR management application receives a PIAR restriction via an authenticated user of the PIAR management application. The PIAR restriction is applicable to certain users of the PIAR management application. The PIAR restriction identifies functionality of the PIAR management application that would otherwise be available to a user of the PIAR management application if the user had an active account for a particular plug-in application that, once linked to that user in the PIAR management application and associated with a particular PIAR, would be capable of supplying at least part of the functionality. The PIAR management application stores the PIAR restriction, including information to block the restricted functionality. Based on the PIAR restriction, the PIAR management application blocks the restricted functionality. Many different types of functionality may be restricted, in various ways.

20 Claims, 4 Drawing Sheets

(56) References Cited

U.S. PATENT DOCUMENTS

| | | |
|---|---|---|
| 2015/0347164 A1 | 12/2015 | Li et al. |
| 2016/0036859 A1 | 2/2016 | Zaitsev |
| 2017/0230312 A1 | 8/2017 | Barrett et al. |
| 2018/0143750 A1 | 5/2018 | Ye |

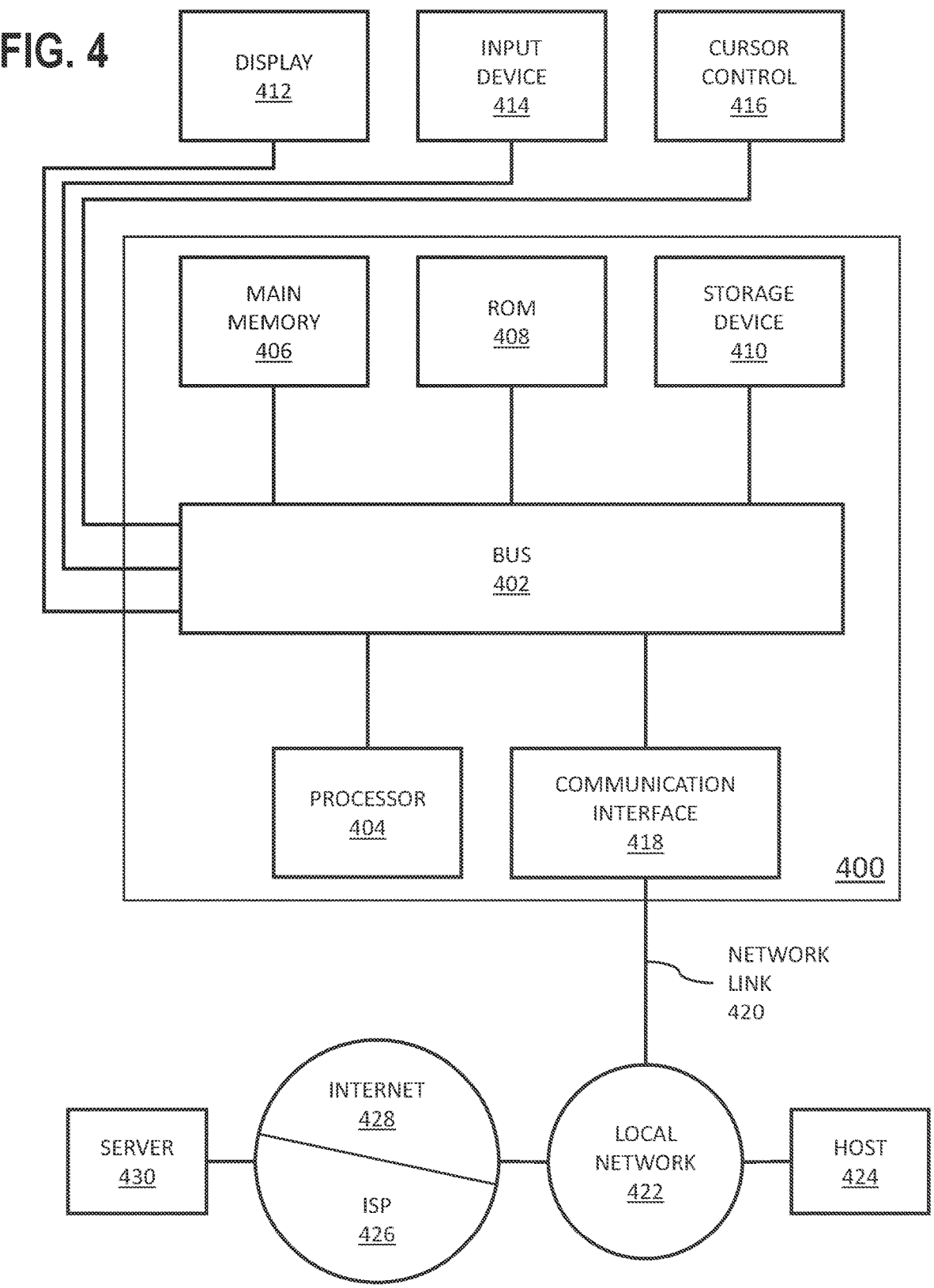

RESTRICTING PLUG-IN APPLICATION RECIPES

INCORPORATION BY REFERENCE; DISCLAIMER

Each of the following applications are hereby incorporated by reference: application Ser. No. 15/994,332 filed on May 31, 2018; application No. 62/527,958 filed on Jun. 30, 2017. The Applicant hereby rescinds any disclaimer of claim scope in the parent application(s) or the prosecution history thereof and advises the USPTO that the claims in this application may be broader than any claim in the parent application(s). This application claims the benefit of U.S. Provisional Patent Application 62/527,958, filed Jun. 30, 2017, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to plug-in-application recipes. In particular, the present disclosure relates to restricting plug-in application recipes.

BACKGROUND

A plug-in-application recipe ("PIAR") is a set that includes a triggering event (referred to herein as a "trigger" or "trigger condition") and an action, arranged logically as an if-then formulation. The "if" portion of the formulation corresponds to a PIAR trigger condition. The "then" portion of the formulation is conditioned on the "if" portion being satisfied, and corresponds to a triggerable action. A plug-in application may supply the action. A plug-in application that supplies an action may be the same as, or different than, a plug-in application that supplies a trigger.

A PIAR management application presents an interface that allows a user to define PIARs. A PIAR definition indicates one or more actions to be executed by the PIAR management application. A PIAR definition further indicates a trigger of a plug-in application. When a PIAR management application detects that a trigger condition is satisfied, the PIAR executes the action(s) corresponding to the detected trigger.

A PIAR management application may be used for many purposes. For example, a PIAR management application may be used to automate repetitive tasks. Examples of PIARs include, but are not limited to: (a) responsive to detecting that a user's car is in the user's driveway (trigger), opening the user's garage door (action); (b) responsive to determining that a user's walked steps have not reached a particular goal by 5 p.m. (trigger), transmitting a notification to the user (action); (c) responsive to detecting a new sales contact in an address book or email (trigger), creating a new folder to store information about the sales contact (action).

The term "plug-in application" refers to the fact that an application's trigger(s) and/or action(s) logically 'plug in' to the PIAR and thus become part of the logic of a PIAR. For example, PIAR management applications may be organized according to a micro-services architecture, such that several independent services are plugged into the PIAR application. A plugged-in service may provide monitoring service(s) specific to a particular application to support trigger(s) for the particular application. Alternatively or in addition, a plugged-in service may provide action service(s) specific to the particular application to support executing action(s) for the particular application.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 is a block diagram illustrating a computer system according to an embodiment.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. PLUG-IN APPLICATION RECIPE MANAGEMENT SYSTEM
3. RESTRICTING A PLUG-IN APPLICATION RECIPE
4. ILLUSTRATIVE EXAMPLE
5. MISCELLANEOUS; EXTENSIONS
6. HARDWARE OVERVIEW
7. COMPUTER NETWORKS AND CLOUD NETWORKS

1. General Overview

A plug-in application recipe ("PIAR") management application manages PIAR definitions. Each PIAR definition identifies a trigger and an action. Values of trigger variables are exposed by a plug-in application to the PIAR management application and are necessary to evaluate the trigger on an ongoing basis. Evaluating the trigger involves determining whether a condition is satisfied, based at least on part on one or more of the values of the trigger variables. An interface for an action is exposed by a plug-in application, which may be the same plug-in application that exposes the trigger variables, or a different plug-in application. The PIAR management application makes the action conditional on the trigger on an ongoing basis, and causes the action to be carried out based on input variables according to the PIAR definition.

To restrict functionality of a PIAR, the PIAR management application receives a PIAR restriction via an authenticated user of the PIAR management application. The PIAR management application stores information indicating which authenticated users have permission to restrict PIAR management application functionality for users. The PIAR restriction is applicable to certain users of the PIAR management application. Specifically, the PIAR restriction identifies functionality of the PIAR management application that would otherwise be available to a user of the PIAR management application if the user had an active account for a particular plug-in application that, once linked to that user in the PIAR management application and associated with a particular PIAR, would be capable of supplying at least part of the functionality. The PIAR management application stores the PIAR restriction, including information to block the restricted functionality. Based on the PIAR restriction, the PIAR management application blocks the restricted functionality. Many different types of functionality may be restricted, in various ways.

One or more embodiments described in this Specification and/or recited in the claims may not be included in this General Overview section.

2. Architectural Overview

Figure 1:
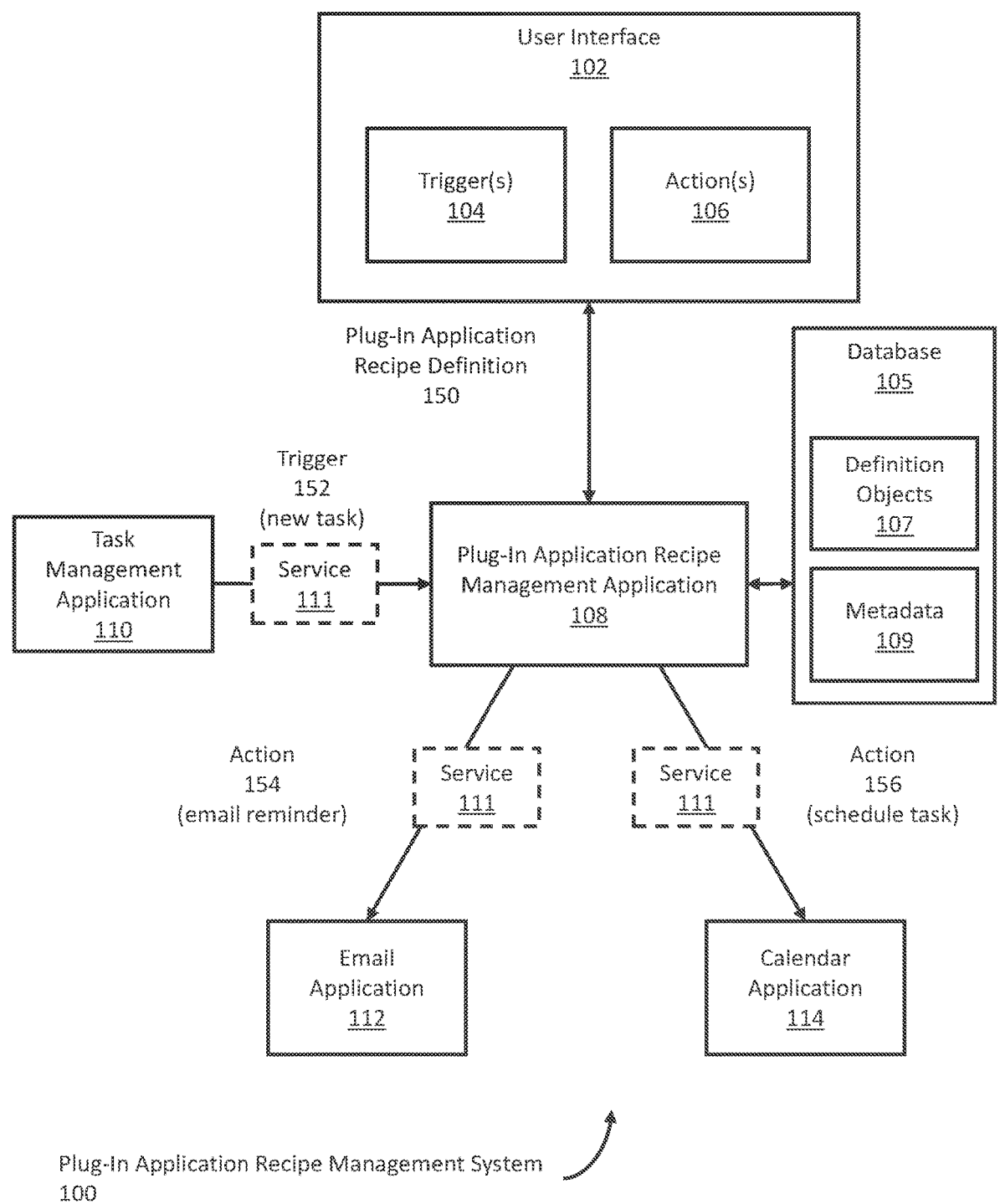
FIG. 1 is a block diagram illustrating a plug-in application recipe management system according to an embodiment.

FIG. 1 is a block diagram illustrating a plug-in application recipe (PIAR) management system 100 according to an embodiment. The PIAR management system 100 includes functionality to generate at least one PIAR in which a variable is transformed.

As illustrated, the PIAR management system 100 includes a PIAR management application 108 and various other components. Embodiments may include more or fewer components than those illustrated. Components may be implemented in software and/or hardware. Specifically, components may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device. Components may be local to or remote from each other. Each component may be distributed over multiple applications and/or machines. Multiple components may be combined into one application and/or machine. Two or more components may be communicatively coupled via a local area network, a wide area network, the internet, an intranet, a cellular network, and/or combinations thereof. Operations described with respect to one component may instead be performed by another component. Additional embodiments and/or examples relating to computer networks are described below.

In an embodiment, a PIAR management application 108 provides a user interface 102 for creating a PIAR definition 150. Specifically, the user interface 102 allows a user to select one or more triggers 104 and one or more corresponding actions 106 to be executed when the trigger(s) 104 are satisfied. As used herein, the trigger(s) 104 and action(s) 106 are referred to collectively as "operations" of the PIAR. Examples of PIARs include, but are not limited to: (a) responsive to detecting that a user's car is in the user's driveway (trigger), opening the user's garage door (action); (b) responsive to determining that a user's walked steps have not reached a particular goal by 5 p.m. (trigger), transmitting a notification to the user (action); (c) responsive to detecting a new sales contact in an address book or email (trigger), creating a new folder to store information about the sales contact (action). The user interface 102 may be a graphical user interface (GUI), a command line interface, or any other type of interface configured to receive user input for creating a PIAR definition 150. Examples of GUIs are discussed in detail below.

In an embodiment, in addition to the trigger(s) 104 and associated action(s) 106, the user interface 102 includes options to specify a name of a PIAR definition, a trigger application that is an application to be monitored for detection of the trigger(s) 104, and/or an application to be used to execute the action(s) 106. One or more of the action(s) 106 may involve generating a new PIAR definition, and one or more of the action(s) 106 may be executed by the PIAR management application 108 itself. A PIAR definition 150 may also include information other than the trigger(s) 104 and action(s) 106.

In an embodiment, a PIAR may involve multiple actions performed in response to detecting a trigger. One or more of the actions may be performed concurrently or in a fixed sequence. A combination of concurrent and/or sequential actions may be used. The output of one action may be used as input to another action. For example, suppose a PIAR is created with a trigger defined as receiving an email from a prospective customer (e.g. receiving an email at an email address only given to prospective customers). In this example, a series of actions performed in response to receiving the email may include (1) determining whether the prospect is already listed in a customer relationship management (CRM) application, and (2) if the prospect is not already listed in the CRM application, adding the prospect to the CRM application and sending a notification email to a sales manager. Adding the prospect to the CRM application and sending the notification email to the sales manager may be performed concurrently or in a particular order. For example, the notification email may be sent only after receiving confirmation from the CRM application that the prospect was added successfully. Many different combinations of concurrent and/or sequential actions may be used in a PIAR.

In an embodiment, one or more actions in a PIAR may be performed conditionally, based on evaluation of the initiating trigger or, if the action is part of a series of actions, evaluation of output from a preceding action. For example, conditional logic (e.g., if, then, else, etc.) may be used to determine, in response to detecting a trigger, the particular sequence of actions, if any, to perform. The PAIR management system 100 may include an interface allowing a user to define such conditional logic for a particular PIAR.

In an embodiment, evaluating a trigger and/or output of a preceding action may involve looping through multiple variable values. For example, a trigger or action may supply an array of values, and evaluating the trigger or action may involve iteratively evaluating (or "looping through") each of those values. Looping through such values may itself be subject to conditional logic. Many different combinations of conditional logic and/or looping through variables may be used to determine the particular action(s), if any, performed when a trigger is detected.

In an embodiment, a PIAR definition 150 includes one or more types of metadata. For example, metadata may identify a user who created the PIAR definition 150, a time and date of creation, an authorization level of the PIAR definition 150 (for example, whether the action(s) 106 are permitted to receive personally identifiable information), the plug-in application(s) associated with the trigger(s) 104 and/or action(s) 106, or any other type of metadata describing or associated with a PIAR. If a PIAR definition is generated recursively in the course of executing another PIAR, the recursively generated PIAR may be thought of as a "child" PIAR and the PIAR that generated it may be thought of as a "parent" PIAR. Metadata associated with a child PIAR may include information about the parent PIAR, directly in the child PIAR's metadata and/or by reference to the parent PIAR's metadata.

In an embodiment, the PIAR management system 100 includes one or more applications that are linked or 'plugged in' to the PIAR management application 108. An application 'plugged in' to the PIAR management application 108 may be referred to as a "plug-in application." A particular plug-in application may be used as a "trigger application," i.e., an application to be monitored for detection of a trigger condition. Alternatively or in addition, a particular plug-in application may be used as an "action application," i.e., an application that executes an action when a trigger condition is satisfied.

In an embodiment, in general, plug-in applications are applications that are (a) executing independently of the detection process of the PIAR management application 108, (b) not being controlled by the detection process of the PIAR management application 108, and/or (c) remote from the PIAR management application 108. Thus, the plug-in application, executing independent of the detection process of the PIAR management application 108 that detects the specified trigger(s) 104, may be referred to herein as an independently executing application. Further, one or more plug-in applications may be considered 'stand-alone' applications relative to the PIAR management application 108. That is, a plug-in application may provide its own user interface (e.g., a GUI) through which a user accesses the full functionality of the plug-in application. In this manner, the plug-in application provides functionality entirely independent of the PIAR management application 108 and does not depend on the PIAR management application 108 to function. A stand-along plug-in application is not a module or component of the PIAR management application 108. One or more plug-in applications and the PIAR management application 108 may be developed and supported by entirely distinct business entities than each other. As an example, FIG. 1 illustrates plug-in applications that include a search application 110, an email application 112, and an audio player application 114, which are independently executing stand-alone applications. Many different types of plug-in applications may be used, and the examples illustrated in FIG. 1 should not be construed as limiting one or more embodiments.

In an embodiment, the PIAR management application 108 stores PIAR definitions (e.g., PIAR definition 150) as PIAR definition objects 107. The definition objects 107 may be stored in a database 105, for example, in a file system, or in any other type of digital storage. The PIAR management application 108 may also store metadata associated with PIAR definitions in the database 105 or other storage. The metadata 109 may be stored within (i.e., as logical components of) definition objects 107 or separately. In an embodiment, definition objects 107 are stored in JavaScript Object Notation (JSON) format, with elements in the JSON structure corresponding to trigger(s) 104, action(s) 106, and/or metadata 109. The JSON structure may also include one or more elements corresponding to transformation operations to be applied to variables associated with PIAR trigger and/or action operations.

In an embodiment, functionality of a plug-in application that is accessible to the PIAR management application 108 is a subset of the plug-in application's full functionality. Specifically, a plug-in application may expose an application programming interface (API) providing access to certain functions and/or data of the plug-in application, without providing access to other functions and/or data of the plug-in application. In other words, the functionality exposed to the PIAR management application 108 may be a proper subset (a.k.a. strict subset) of the plug-in application's full functionality. For example, the API may be a restful state transfer (REST) API. Other types of APIs may be used. As an example, an email application may not expose email sending functionality to the PIAR management application 108, but may expose information about emails that have been received, such as the date, time, sender, recipient, subject line, and content of the email. As another example, a calendar application may not expose functionality to cancel events, but may expose information about events that have already been scheduled (e.g., date, time, location, participants, etc.) and/or functionality to schedule new events. The set of functionality exposed to the PIAR management application 108 may depend on one or more authorization policies. In an embodiment, the PIAR management application 108 stores an authorization token that it uses to authenticate access to a plug-in application's API. As an example, the PIAR management application 108 may prompt a user, via the user interface 102, to input a username and password to access an email application's API. The PIAR management application 108 may store the username and password in an encrypted token that it uses to request access to the exposed functions and/or data of the email application.

In an embodiment, the user interface 102 allows a user to specify triggers that do not correspond to functions or data natively exposed by a plug-in application. For example, a trigger application may expose data values that change over time, without natively exposing any functions that monitor or compare the data values as they change. A trigger may nonetheless be defined for monitoring the trigger application for changes in the data values over time. As another example, a trigger may look for an aggregate data value (e.g., summed or averaged over time or over a number of consecutive data retentions or changes), or a masked data value (e.g., a data value that indicates the presence or absence of data or a change in data, even though the data itself is masked to the PIAR management application 108 or the end user, or is altogether unavailable to the end user). Many different types of trigger conditions may be inferred, derived, or otherwise determined from a trigger application without being natively supported by the trigger application.

As an example, a search application 110 may be linked to ('plugged into') the PIAR management application 108. Linking the search application 110 to the PIAR management application 108 may involve monitoring the search application 110 (e.g., via a REST API) and reporting, to the PIAR management application 108, the detection of triggers defined in relation to the search application 110. For example, a trigger may involve detecting the execution of a search for receipts via the search application 110. The search application 110 may be monitored via a corresponding service 111 that detects when a search for receipts is executed via the search application 110. The service 111 notifies the PIAR management application 108 if and when a search for receipts is executed via the search application 110. The service 111 may be implemented separately from the search application 110 or as a component (e.g., an installable module or plug-in) of the search application 110.

As another example, the search application 110 corresponds to a car sales application. A potential customer may search for a car from a database of advertised cars and request a meeting with a sales representative to purchase the car. The trigger condition may be defined as receiving, from a user, a sales meeting request that references one of the advertised cars.

In an embodiment, a plug-in application includes a monitoring system for notifying the PIAR management application 108 of predefined trigger conditions, with predefined parameters that may be customizable. For example, an application may include a monitoring system that notifies the PIAR management application 108 when an application-specific trigger such as a keyword search on email is satisfied. The application may allow a limited amount of customization for that application-specific trigger, allowing customization in some ways (such as specifying the keyword for the search) without allowing customization in other ways (such as, for example, whether the keyword is within N words of another keyword, or whether information about an earlier email with the keyword has already been detected and stored in a table).

In an embodiment, monitoring a plug-in application (e.g. using a service 111) to identify a triggering event is done on an ongoing basis. That is, the monitoring process is initiated and continues to operate until a terminating condition is satisfied. Thus, a particular PIAR may be evaluated and executed many times, in response to many triggering events identified by the associated monitoring process. In general, a PIAR does not cease to operate upon the first instance of the selected triggering event. For example, a PIAR that opens a garage door in response to detecting a vehicle in the driveway may operate in perpetuity and cause the garage door to open dozens, hundreds, or even thousands of times. A monitoring process associated with a particular PIAR may operate in perpetuity until it is manually terminated by a user (e.g., via the user interface 102). Alternatively, a PIAR definition may include a terminating condition, such as a certain length of time to operate or a maximum number of times to perform actions in response to triggers. Typically a PIAR is created with the intent that it function as an automated background service, continuing to operate in perpetuity, without further manual intervention.

In an embodiment, the search application 110 (or other application plugged into the PIAR management application 108) is not in any way affected by the execution of the PIAR management application 108 which uses at least one of the fields managed by the search application 110 for detecting the trigger(s) 104. The PIAR management application 108 may correspond to micro-services that provide altogether different functionality than the independently executing search application 110. The PIAR management application 108 may determine that the action(s) 106 have been triggered when a change in the field(s) managed by the independently executing search application 110 satisfy a threshold criteria, such as a certain value or aggregated value. As an example, a field managed by the search application 110 may specify a location. Search results associated with the location are to be presented in response to a query. A change in city may satisfy the threshold criteria. The threshold criteria specified to the PIAR management application 108 may be different than any threshold criteria supported by the built-in monitoring process(es) of the plug-in application, even though the threshold criteria may be based on variables that are accessible from the plug-in application and even though such variables may change over time. The PIAR management application 108 may execute (directly or by causing execution by another process) the action(s) 106 in response to detecting that the action(s) 106 have been triggered.

Similar to a trigger application (e.g. search application 110), an action application (e.g., email application 112 or audio player application 114) is linked or plugged into the PIAR management application 108. An action application is an application that executes an action as directed or requested by the PIAR management application 108 (although the PIAR management application 108 may also be said to "execute" the action in the sense that the PIAR management application 108 initiates execution of the action). The PIAR management application 108 requests execution of actions in response to detection of triggers as described above. The action applications may be linked to the PIAR management application 110 via respective services 111. A service 111 may be implemented separately from or as a component of an action application. A service 111 may use an application programming interface (API) corresponding to an action application, to use the action application for executing an action according to a PIAR. A particular action application may also be a trigger application. That is, the same application may expose one or more triggers while also exposing an API for executing actions. The same application may be used as both a trigger application and an action application in the same PIAR, or in different PIARs.

In an embodiment, the PIAR management application 108 is itself an action application. The PIAR management application 108 may execute an action that generates a new PIAR. As an example, a new PIAR may be generated for managing client purchases. The new PIAR may define a trigger as a first purchase by a client. The new PIAR may define actions such as creating a database record for storing records of client purchases or creating a product recommendation list based on completed purchases by the client.

In an embodiment, the PIAR management application 108 supports PIAR definitions that involve a series of actions. For example, in response to a particular trigger, a PIAR may perform a particular action, "Action A." The output of Action A may then be used as input to another action, "Action B." The output of Action B may then be used as input to another action, "Action C," and so on. Functions and/or data exposed by Action A may be available as input to Action B and/or as input to subsequent actions, such as Action C. Functions and/or data exposed by a later action, such as Action C, may not be available as input to an earlier action, such as Action B or action A. For example, if Action B completes before Action C completes, then it is not possible for Action B to receive input from Action C.

In an embodiment, the PIAR management application 108 includes functionality for restricting a PIAR. Specifically, the PIAR management application may store a PIAR restriction (e.g., in the database 105) that includes information used by the PIAR management application 108 to block restricted functionality. The PIAR restriction may be defined by an authorized user of the PIAR management application 108 via a user interface such as the user interface 102. Restricting a PIAR is discussed in further detail below.

3. Restricting a Plug-in Application Recipe

Figure 2:
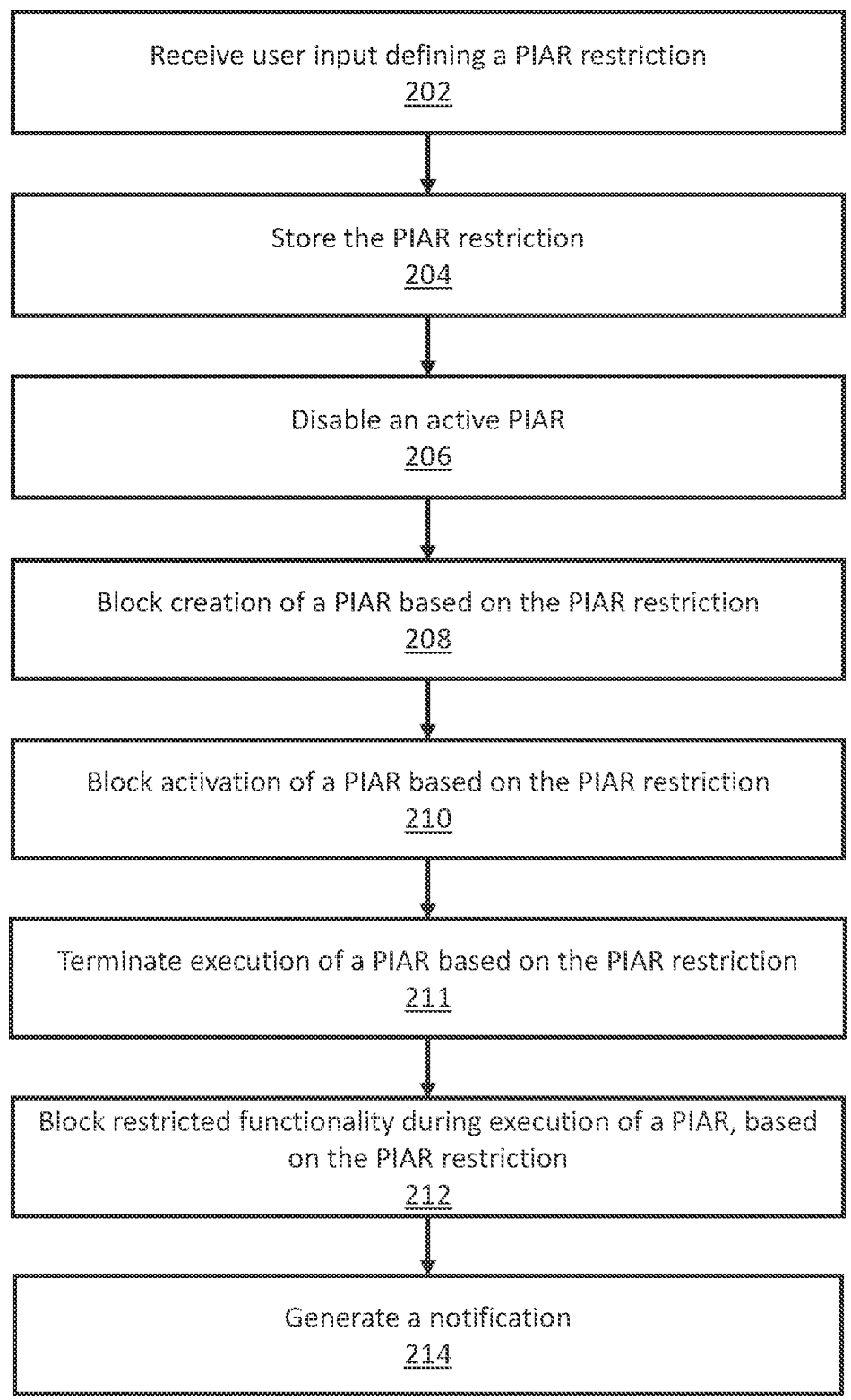
FIG. 2 illustrates an example set of operations for restricting plug-in application recipes according to an embodiment.

FIG. 2 includes an example set of operations for restricting a plug-in application recipe ("PIAR"). Other operations not described herein may be used instead and/or in addition to the described operations. One or more operations illustrated in FIG. 2 may be modified, rearranged, or omitted altogether. Accordingly, the particular sequence of operations illustrated in FIG. 2 should not be construed as limiting the scope of one or more embodiments.

In an embodiment, the PIAR management application 108 receives user input defining a PIAR restriction (Operation 202). The PIAR restriction identifies restricted functionality of the PIAR management application 108 that would otherwise be available to a particular user or group of users of the PIAR management application 108. A user of the PIAR management application 108 has an active account for a particular plug-in application (for example, an active account for an email application that may be used as a plug-in application). If the active plug-in application account were linked to the user in the PIAR management application 108, and if the plug-in application were associated with a particular PIAR (for example, by configuring a PIAR with a trigger that involves monitoring the email application mentioned in the previous example for a particular trigger condition), then the plug-in application would be thought of as supplying functionality to the PIAR management application. Based on a PIAR restriction, the PIAR management application 108 blocks some or all of the functionality supplied by the plug-in application. As discussed in further detail below, different types of PIAR restriction may be defined, and the PIAR management application 108 may block restricted functionality in many different ways.

In an embodiment, PIARs are enforced by the PIAR management 108 according to an optimistic restriction model, whereby PIAR functionality is not restricted unless that particular functionality is restricted via a PIAR restriction or other restriction mechanism. Alternatively, a pessimistic restriction model may be used, whereby all PIAR functionality is blocked unless explicitly permitted. In a pessimistic restriction model, PIAR permissions may be used instead of PIAR restrictions. That is, the PIAR management application 108 may store PIAR permission information that identifies which PIAR functionality has been explicitly permitted. Using an optimistic restriction model may provide users with access to a broader range of functionality, while still allowing for certain functionality to be restricted as needed.

In an embodiment, user input defining a PIAR restriction is received via a user interface of the PIAR management application 108, such as user interface 102. The user input identifies the particular functionality that is restricted. In addition, the user input may identify a particular user or group of users of the PIAR management application 108 for whom the functionality is restricted. For example, particular functionality may be restricted for users in a particular user group and/or who do not have a designated minimum authorization level. Alternatively or in addition, the user input may identify how the PIAR management application 108 should respond to an instance of encountering the restricted functionality. Different types of restricted functionality and different types of responses to encountering restricted functionality are described below.

In an embodiment, a user who provides input defining the PIAR restriction is an authenticated user of the PIAR management application 108. The PIAR management application 108 may store user credentials (e.g., in database 105 or another location) differentiating between users who have permission to restrict PIAR functionality and users who do not have permission to restrict PIAR functionality. Permission to restrict PIAR functionality may be based on user group and/or authorization level, for example. Different authenticated users may have permission to restrict functionality for different users of the PIAR management application 108, or to restrict functionality relating to different plug-in applications. For example, a system administrator may have permission to restrict functionality for all users, while a manager may have permission to restrict functionality only for users in a particular business unit. As another example, a manager for a sales group may have permission to restrict functionality only for PIARs that involve sales-related applications or services. Many different configurations of credentials may be used to provide different users with permission to restrict functionality for different users, for PIARs involving different plug-in applications, and/or for different subsets of functionality supplied by a plug-in application.

In an embodiment, the PIAR management application 108 allows users to select transformations to be applied to the values of variables exposed by plug-in applications in a PIAR. Transformations are discussed in further detail in U.S. Provisional Patent Application 62/527,949, titled "Transforming Plug-In Application Recipe Variables," incorporated herein by reference in its entirety. A PIAR restriction may indicate that a particular transformation or group of transformations is prohibited. For example, if transformations are implemented in scripting language, the PIAR restriction may indicate that a particular script function should be added to a "blacklist" of prohibited functions. Alternatively, a particular transformation may not be allowed unless a corresponding scripting function it is added to a "whitelist" of permitted functions. A PIAR restriction or PIAR permission may apply to a specific function, a specific library of functions, and/or any function having a certain characteristic. For example, functions that attempt to access a third-party server may not be permitted.

In an embodiment, after receiving a definition of a PIAR restriction (e.g., via user input as described above), the PIAR management application 108 stores the PIAR restriction (Operation 204). Storing the PIAR restriction involves storing information that the PIAR management application 108 uses to block restricted functionality. The PIAR management application 108 may store the PIAR restriction information in the database 105 or in another location. Further, the PIAR restriction information may take many different forms. For example, the PIAR restriction information may be stored in a JavaScript Object Notation (JSON) data structure, in some other type of markup language, or in another form entirely.

In an embodiment, the PIAR restriction identifies restricted functionality that is already being used by one or more active PIARs. For example, the PIAR restriction may prohibit use of a particular plug-in application, and an active PIAR may already exist that uses that particular plug-in application. Accordingly, based on the PIAR restriction, the PIAR management application 108 may disable any active PIAR that is currently using the restricted functionality (Operation 206). Disabling the active PIAR may involve simply making the PIAR inactive. Alternatively, if the PIAR restriction prohibits creation of the PIAR, disabling the active PIAR may involve deleting the PIAR altogether. If the PIAR restriction does not prohibit creation or activation of the PIAR (for example, if the PIAR restriction is to be applied during the execution of a PIAR, based on data exposed at that time), then it may not be necessary to disable or delete the active PIAR.

In an embodiment, based on the PIAR restriction, the PIAR management application 108 blocks creation of a PIAR (Operation 208). Blocking creation of a PIAR may be based on many different types of PIAR restrictions. The PIAR restriction may prohibit a user from linking a particular plug-in application (or more specifically, a user's active account for the plug-in application) to a user in the PIAR management application. Blocking the linking of the plug-in application effectively blocks creation of a PAIR using that plug-in application.

Alternatively or in addition, linking a plug-in application to a user in the PIAR management application 108 may be allowed, but the PIAR restriction may block the creation of a PIAR in which the plug-in application is used. Blocking the use of the plug-in application in a particular PIAR may depend on various factors. A user may be blocked from using a particular plug-in application altogether. Alternatively or in addition, the PIAR restriction may block the creation of a PIAR in which a particular plug-in application (and/or group of plug-in applications) interacts with another particular plug-in application (and/or group of plug-in applications). For example, to help protect the privacy of sensitive financial information and/or personally identifiable information ("PII"), a PIAR restriction may prohibit the creation of a PIAR that uses both a finance application and a social media application. In an embodiment, the PIAR management application 108 stores information that identifies plug-in applications as belonging to different groups or categories. For example, the plug-in application 108 may support tags applied to plug-in applications, with names such as "finance" or "social."

Alternatively or in addition, instead of blocking the use of an entire plug-in application, the PIAR restriction may block the use of a particular operation of the plug-in application. For example, a calendar application may expose an API to create, modify, and delete calendar events, and a PIAR restriction may prohibit the creation of PIARs in which calendar events are deleted. Blocking the use of a particular plug-in application operation in a particular PIAR may depend on various factors. A user may be blocked from using the operation altogether, or the PIAR restriction may block the creation of a PIAR in which a particular operation (and/or type of operation) interacts with another particular operation (and/or group of operations). For example, a finance application may supply an operation that outputs publicly available financial information (e.g., quarterly earnings reports) and another operation that outputs private financial information (e.g., employee compensation). The operation that outputs private financial information may be prohibited from interacting with an operation of a social media application, without prohibiting the same interaction for the operation that outputs publicly available financial information. In an embodiment, the PIAR management application 108 stores information that identifies different operations of plug-in applications as belonging to different groups or categories. For example, the plug-in application 108 may support tags applied to operations of plug-in applications, with names such as "public" or "private."

Alternatively or in addition, the PIAR restriction may prohibit the creation of a PIAR in which particular plug-in applications and/or operations thereof are placed in a particular order. For example, a PIAR may be allowed to use both a finance application and a social media application, as long as all operations using the social media application are performed before any operations using the finance application, because that particular order of operations does not risk the publication of financial data on social media.

In an embodiment, to block a user from creating a PIAR based on a PIAR restriction, the PIAR management application 108 disables the restricted functionality in a user interface through which the restricted functionality would otherwise be available. As one example, to block the user from linking a particular plug-in application to the user, the PIAR management application 108 may gray out, hide, or otherwise make the linking functionality inaccessible for that particular plug-in application. As another example, to block the user from using a particular plug-in application in a PAIR, the PIAR management application 108 may gray out, hide, or otherwise make that particular plug-in application inaccessible in the PIAR creation interface. As another example, to block the user from using a particular operation of a plug-in application in a PIAR, the PIAR management application 108 may gray out, hide, or otherwise make that particular operation inaccessible in the PIAR creation interface. Many different ways of disabling or otherwise blocking restricted functionality may be used.

In an embodiment, based on the PIAR restriction, the PIAR management application 108 blocks activation of a particular PIAR (Operation 210). A PIAR is said to be active when monitoring for trigger conditions is in progress according to the PIAR. If the PIAR has already been defined when the PIAR restriction is created, the PIAR management application 108 may not delete the existing PIAR (see the discussion of Operation 206 above), but may simply block the existing PIAR from being activated. If the PIAR has not already been defined when the PIAR restriction is created, the PIAR management application 108 may allow the PIAR to be created (e.g., to allow for the possibility that the restriction is lifted at a future time), but may block the PIAR from being activated as long as the PIAR restriction remains active.

In an embodiment, based on the PIAR restriction, the PIAR management application 108 terminates execution of a PIAR (Operation 211). Terminating execution of a PIAR is not the same as disabling the PIAR altogether. Terminating execution of a PIAR may still allow for the PIAR's trigger condition(s) to be evaluated. In addition, terminating execution of a PIAR may still allow for outputs of intermediate operations in the PIAR to be evaluated. However, at some point in the evaluation of a PIAR, the PIAR management application 108 may determine that the PIAR should not be allowed to continue executing. For example, the PIAR restriction may prohibit execution of any PIAR in which personally identifiable information is exposed. In the course of evaluating a PIAR, the PIAR management application 108 may determine that data exposed by a trigger or other operation includes a social security number (for example, using pattern matching to identify a number in the format NNN-NN-NNNN). Upon determining that personally identifiable information is exposed, the PIAR management application 108 may terminate execution of the PIAR. Alternatively or in addition, the PIAR management application 108 may determine that allowing the PIAR to continue executing would exceed a threshold expense (measured in money, computational resources, or any other type of expense), where the threshold is defined by the PIAR restriction. For example, an operation used in a PIAR may output a large number of records that would be prohibitively expensive to process, and accordingly, the PIAR management application 108 may terminate execution of the PIAR to avoid that expense. Many different types of PIAR restrictions may be defined that call for terminating execution of a PIAR under many different conditions.

In an embodiment, based on the PIAR restriction, the PIAR management application 108 blocks restricted functionality during execution of a PIAR (Operation 212), without going so far as to terminate execution of the PIAR. (Terminating execution of the PIAR may be thought of as a more severe form of blocking functionality.) Specifically, the PIAR management application 108 may allow the PIAR to continue executing, while also taking measures to block the restricted functionality. For example, the PIAR restriction may prohibit the transmission, from one PIAR operation to another PIAR operation, of data that is exposed to the PIAR by a plug-in application and that has a restricted characteristic, i.e., a characteristic that is defined as restricted according to the PIAR restriction. A restricted characteristic may include personally identifiable information such as a social security number, phone number, account number, etc., and/or sensitive company information such as internal documents, financial records, etc. To block the restricted functionality, the PIAR management application 108 may mask the data exposed by the plug-in application before using the data in another operation. Masking the data may involve, for example, removing characters or replacing characters with other characters. A PIAR restriction may define data as having a restricted characteristic in various ways. For example, the restricted characteristic may be identified according to a pattern matching scheme, such as "NNN-NN-NNN," where "N" is any single digit, which is the typical format for social security numbers. Alternatively or in addition, the PIAR management application 108 may use heuristic analysis to identify data that is likely to have a restricted characteristic, such as identifying data that is likely to contain salary information even if the data does not match any predefined pattern. Many different types of restricted characteristics may be used as the basis for masking data. As another example, the PIAR management application 108 may identify, during execution of a PIAR, that data exposed by a plug-in application appears to have originated from a company file server, even if the company file server is not explicitly used as a plug-in application in the PIAR. Using pattern matching, heuristics, or any other type of analysis, the PIAR management application 108 may determine that the PIAR is attempting to perform restricted functionality and therefore block the restricted functionality.

In an embodiment, when the PIAR management application 108 restricts functionality based on a PIAR restriction, the PIAR management application 108 generates a notification (Operation 214) describing the event. The notification may be stored in an event log, to be used for troubleshooting, reporting, or any other administrative purpose. Alternatively or in addition, a notification may be transmitted to a user, indicating that the functionality was restricted. For example, a notification may be transmitted to a user attempting to create a PIAR with restricted functionality. As another example, a notification may be transmitted to a different user, such as a system administrator or manager. The notification may be transmitted via email, pop-up window in a graphical user interface (GUI), text message, or any other type of notification format. In an embodiment, generating a notification helps alert a user responsible for maintaining the PIAR management application 108 when restricted functionality is attempted, allowing the user to respond appropriately.

In the operations (202 through 214) described above, various examples and permutations have been discussed. It should be appreciated that permutations of these examples may be applied to other operations than those for which they were explicitly discussed. For example, a form of heuristic analysis described with respect to Operation 212 may be used to determine that an active PIAR should be deactivated (Operation 206). Similarly, an example applicable to terminating execution of a PIAR (Operation 211) may be applicable to blocking activation of a PIAR (Operation 210). Many different permutations of the examples and operations are possible, mutatis mutandis, and embodiments should not be considered limited to the specific combinations of operations and examples discussed above. These examples are discussed for illustrative purposes only and should not be construed as limiting of one or more embodiments.

In an embodiment, PIAR restrictions allow for the imposition of useful and/or necessary restrictions on users' ability to create PIARs via the PIAR management application 108. For example, PIAR restrictions may be helpful and/or necessary to comply with legal obligations, such as those governing the storage and transmission of personally identifiable information. Alternatively or in addition, PIAR restrictions may be used to protect sensitive data that is not otherwise required by law to be protected, such as trade secrets, employee details, customer details, etc. Alternatively or in addition, PIAR restrictions may be used to enforce company policies, such as restrictions on employee access to social media applications, restrictions on employees storing company data on external servers, etc. In general, PIAR restrictions may be used to provide users of the PIAR management application 108 with broad leeway to create PIARs, while maintaining appropriate restrictions.

4. Illustrative Example

Figure 3:
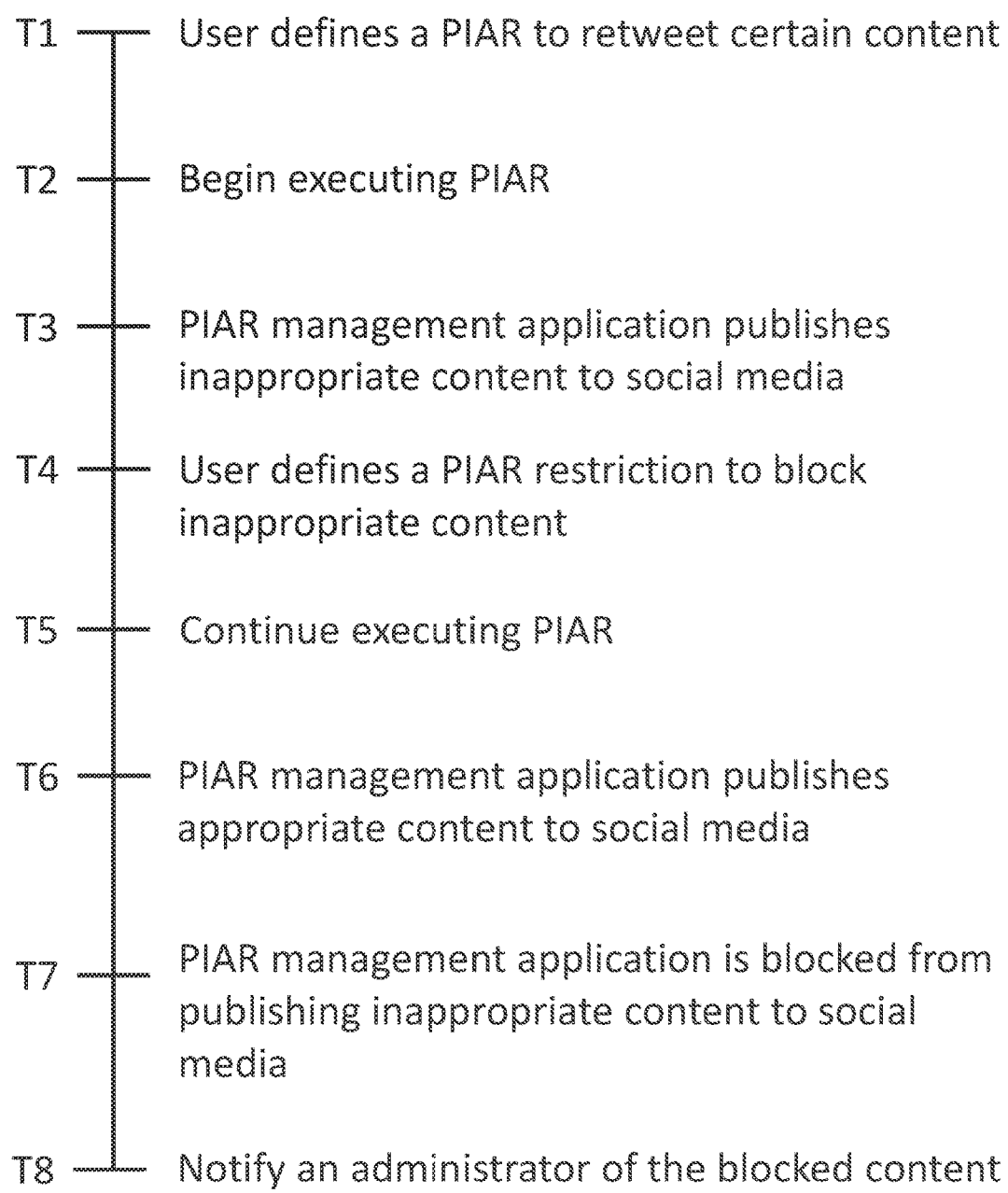
FIG. 3 illustrates an example of a sequence of operations for restricting a plug-in application recipe in accordance with one embodiment.

FIG. 3 illustrates an example of a sequence of operations for restricting a PIAR in accordance with one embodiment. This example is provided for illustrative purposes only, and embodiments should not be construed as limited by this example.

As illustrated in FIG. 3, a timeline of events proceeds from top to bottom, with different times marked as T1, T2, etc. and corresponding descriptions alongside each time marking. At time T1, a user defines a PIAR, via an interface of a PIAR management application. The PIAR identifies one or more triggers and one or more actions. In this example, the PIAR is designed to monitor Twitter™ and retweet, to a corporate Twitter™ account, any tweet that (a) includes the #BestProductEver hashtag and (b) originates from a Twitter™ account that is in a whitelist of trusted users (e.g., company employees). The PIAR identifies, as a trigger, the publication of any tweet, by a whitelisted user, that includes the #BestProductEver hashtag. The PIAR identifies, as an action, retweeting the tweet to the corporate Twitter™ account.

At time T2, the PIAR management application begins executing the PIAR. Specifically, the PIAR management system uses a monitoring service to monitor Twitter™ and identify whenever a tweet with the defined criteria is published. When a tweet with the defined criteria is published, the trigger condition is satisfied and the tweet is used as input to the action. In this example, the monitoring service identifies a particular tweet, from a whitelisted user, that includes the #BestProductEver hashtag. However, the tweet also includes inappropriate content (e.g., language that is not suited for publication to a corporate social media account).

The PIAR does not include any language-based filters. Accordingly, at time T3, according to the PIAR definition, the PIAR management application publishes the inappropriate content to social media by retweeting the tweet using the corporate Twitter™ account.

At time T4, a user defines a PIAR restriction, via an interface of the PIAR management application. The user who defines the PIAR restriction may be the same user or a different user than the user who defined the PIAR. The interface used to define the PIAR restriction may be the same interface or a different interface than the interface used to define the PIAR. The PIAR restriction applies to all PIARs. Specifically, the PIAR restriction prohibits any action, defined in a PIAR, from publishing inappropriate content to a social media account. The PIAR management application receives the user input and stores the PIAR restriction.

In this example, the PIAR restriction does not block the creation, activation, or execution of a PIAR. PIARs are still allowed to link to social media applications and publish content to social media accounts. Accordingly, at time T5, the PIAR management application continues executing the PIAR. At time T6, the PIAR management application publishes appropriate content to social media. The monitoring service identifies a particular tweet, from a whitelisted user, that includes the #BestProductEver hashtag. The PIAR management application applies the PIAR restriction and does not detect any inappropriate content. After determining that the tweet does not include any inappropriate content, the PIAR management application executes the action defined in the PIAR, to retweet the tweet using the corporate Twitter™ account.

At time T7, the PIAR management application is blocked from publishing inappropriate content to social media. The monitoring service identifies another tweet, from a whitelisted user, that includes the #BestProductEver hashtag. The PIAR management application applies the PIAR restriction and detects that the tweet includes inappropriate content. Because the tweet includes inappropriate content, the PIAR management application does not execute the action defined in the PIAR. The PIAR management application does not retweet the tweet using the corporate Twitter™ account.

At time T8, the PIAR management application notifies an administrator of the blocked content. The administrator is responsible for managing the whitelist of trusted users associated with the PIAR. Based on the notification, the administrator may review the tweet and determine that the user who originated the tweet should no longer be on the whitelist. The PIAR is allowed to continue executing, but inappropriate content continues to be blocked based on the PIAR restriction, and the administrator has an opportunity to take remedial action as needed.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used according to an embodiment. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
receiving, via an authenticated user of a plug-in application recipe ("PIAR") management application, a PIAR permission,
wherein the PIAR permission is applicable to a plurality of users of the PIAR management application,
wherein the PIAR management application stores information indicating that the authenticated user has permissions to permit PIAR functionality for at least the plurality of users, the PIAR functionality comprising automatically executing a prescribed action in response to a trigger condition being met,
wherein the PIAR management application manages PIAR definitions, each PIAR definition identifying
(a) a trigger for which one or more trigger variables, values of which are necessary to evaluate the trigger on an ongoing basis, are exposed by a first plug-in application to the PIAR management application, wherein an instance of evaluating the trigger comprises determining whether a restricted characteristic condition is satisfied based at least in part on one or more values of the one or more trigger variables, the one or more trigger variables that satisfy the restricted characteristic condition comprising one or more of
any personally identifiable information,
private company information, or
an unauthorized communication originating from a private computing device, and
(b) an action for which a second plug-in application exposes an interface to the PIAR management application for causing the second plug-in application to carry out the action, wherein an instance of evaluating the action comprises carrying out the action based on one or more values of one or more input variables that are input to the action in the PIAR definition,
wherein the PIAR management application makes the action conditional on the trigger on an ongoing basis, and
wherein the PIAR permission identifies permitted functionality of the PIAR management application that would otherwise be unavailable to any particular user of the plurality of users having an active account for a particular plug-in application that, once linked to the particular user in the PIAR management application and associated with a particular PIAR, would be not capable of supplying at least part of the permitted functionality if not for the PIAR permission, the permitted functionality of the PIAR management application comprising one or more of: allowing creation of a PIAR or allowing activation of a PIAR; and
storing the PIAR permission, wherein the PIAR management application stores information to allow the permitted functionality.

2. The medium of claim 1, wherein based on the PIAR permission, the PIAR management application allows the permitted functionality during execution of the particular PIAR.

3. The medium of claim 1, wherein based on the PIAR permission, the PIAR management application displays data that is exposed to the PIAR by the particular plug-in application and that has a permitted characteristic.

4. The medium of claim 1, wherein the PIAR management application generates a notification when the permitted functionality is performed.

5. The medium of claim 1, wherein based on the PIAR permission, the PIAR management enables an active PIAR that uses the permitted functionality.

6. The medium of claim 1, wherein based on the PIAR permission, the PIAR management application enables a graphical user interface (GUI) element that would otherwise make the permitted functionality unavailable to the plurality of users.

7. The medium of claim 1, wherein based on the PIAR permission, the PIAR management application permits linking of the active account to the particular user in the PIAR management application.

8. The medium of claim 1, wherein based on the PIAR permission, the PIAR management application permits a particular operation of the particular plug-in application.

9. The medium of claim 1, wherein based on the PIAR permission, the PIAR management application permits interaction, via the PIAR management application, between the particular plug-in application and a different plug-in application.

10. The medium of claim 1, wherein based on the PIAR permission, the PIAR management application permits interaction between a first operation of the particular plug-in application and a second operation of a different plug-in application.

11. The medium of claim 1, wherein the PIAR permission is based on a legal compliance rule.

12. The medium of claim 1, wherein the PIAR permission is based on authorization levels of the plurality of users of the PIAR management application.

13. The medium of claim 1, wherein the PIAR management application enforces PIAR permission according to an optimistic restriction model, wherein PIAR functionality is permitted unless explicitly restricted.

14. The medium of claim 1, wherein based on the PIAR permission, the PIAR management application permits execution of the particular PIAR when execution of the particular PIAR would not exceed a threshold expense.

15. The medium of claim 1, wherein the PIAR permission is based on a particular ordering of operations in the particular PIAR.

16. A method comprising:
receiving, via an authenticated user of a plug-in application recipe ("PIAR") management application, a PIAR permission,
wherein the PIAR permission is applicable to a plurality of users of the PIAR management application,
wherein the PIAR management application stores information indicating that the authenticated user has permissions to permit PIAR functionality for at least the plurality of users, the PIAR functionality comprising automatically executing a prescribed action in response to a trigger condition being met,
wherein the PIAR management application manages PIAR definitions, each PIAR definition identifying
(a) a trigger for which one or more trigger variables, values of which are necessary to evaluate the trigger on an ongoing basis, are exposed by a first plug-in application to the PIAR management application, wherein an instance of evaluating the trigger comprises determining whether a restricted characteristic condition is satisfied based at least in part on one or more values of the one or more trigger variables, the one or more trigger variables that satisfy the restricted characteristic condition comprising one or more of
any personally identifiable information,
private company information, or
an unauthorized communication originating from a private computing device, and
(b) an action for which a second plug-in application exposes an interface to the PIAR management application for causing the second plug-in application to carry out the action, wherein an instance of evaluating the action comprises carrying out the action based on one or more values of one or more input variables that are input to the action in the PIAR definition,
wherein the PIAR management application makes the action conditional on the trigger on an ongoing basis, and
wherein the PIAR permission identifies permitted functionality of the PIAR management application that would otherwise be unavailable to any particular user of the plurality of users having an active account for a particular plug-in application that, once linked to the particular user in the PIAR management application and associated with a particular PIAR, would be not capable of supplying at least part of the permitted functionality if not for the PIAR permission, the permitted functionality of the PIAR management application comprising one or more of: allowing creation of a PIAR or allowing activation of a PIAR; and
storing the PIAR permission, wherein the PIAR management application stores information to allow the permitted functionality.

17. The medium of claim 16, wherein based on the PIAR permission, the PIAR management application allows the permitted functionality during execution of the particular PIAR.

18. The medium of claim 16, wherein based on the PIAR permission, the PIAR management application displays data that is exposed to the PIAR by the particular plug-in application and that has a permitted characteristic.

19. The medium of claim 16, wherein the PIAR management application generates a notification when the permitted functionality is performed.

20. The medium of claim 16, wherein based on the PIAR permission, the PIAR management enables an active PIAR that uses the permitted functionality.

* * * * *

UNITED STATES PATENT AND TRADEMARK OFFICE
CERTIFICATE OF CORRECTION

| | |
|---|---|
| PATENT NO. | : 11,507,696 B2 |
| APPLICATION NO. | : 17/125096 |
| DATED | : November 22, 2022 |
| INVENTOR(S) | : Diekmann et al. |

It is certified that error appears in the above-identified patent and that said Letters Patent is hereby corrected as shown below:

In the Specification

In Column 4, Line 58, delete "PAIR" and insert -- PIAR --, therefor.

In Column 11, Line 15, delete "PAIR" and insert -- PIAR --, therefor.

In Column 12, Line 17, delete "PAIR" and insert -- PIAR --, therefor.

Signed and Sealed this
Eighth Day of August, 2023

Katherine Kelly Vidal
*Director of the United States Patent and Trademark Office*